No. 874,760. PATENTED DEC. 24, 1907.
J. H. GLOSAP.
NUT LOCK.
APPLICATION FILED DEC. 3, 1906.

Witnesses
G. R. Thomas
J. W. Quinn

Inventor
J. H. Glosap
By Chandler Chandler
Attorneys

UNITED STATES PATENT OFFICE.

JOHN H. GLOSAP, OF NOTTAWA, MICHIGAN.

NUT-LOCK.

No. 874,760.  Specification of Letters Patent.  Patented Dec. 24, 1907.

Application filed December 3, 1906. Serial No. 346,105.

*To all whom it may concern:*

Be it known that I, JOHN H. GLOSAP, a citizen of the United States, residing at Nottawa, in the county of St. Joseph, State of Michigan, have invented certain new and useful Improvements in Nut-Locks; and I do hereby declare the following to be a full, clear, and exact description of the invention, such as will enable others skilled in the art to which it appertains to make and use the same.

This invention relates to nut locks, and more particularly to that class which comprise a grooved bolt, a washer having a tongue adapted to enter the groove in the bolt and provided with a circular series of openings, and a nut having a spring-pressed pin adapted for interchangeable engagement in the openings in the washer, and the object of the invention is to provide a device of this class which is adaptable for use upon any threaded bolt or rod regardless of the connection in which the bolt is used. Many such devices are only adapted for use in the construction of railroad tracks and are not fitted for use elsewhere but the lock disclosed by me may not only be used in this connection but may be further used on coupling rods for engines, and where it may be required that the nut shall remain in the position to which it is turned or adjusted—that is, to be neither tightened nor loosened.

The construction of the locking pin of my device is such that a pair of ordinary pincers may be utilized to withdraw the pin from locking engagement with the washer and move it into such position that it may be released.

To accomplish the above stated result, the pin has its upper end portion bent over in the arc of a circle and has the extreme end of its bent over portion normally seated in a small recess in the outer face of the nut. The said outer face of the nut is rounded at each side and hence the pin may be withdrawn sufficiently to cause its said bent over end to rest upon the outer face of the nut and then twisted to cause it to ride upon the curved portion of the face. The bowed or turned-over portion of the pin, even when the pin is in locking position, is in spaced relation with the outer face of the nut and hence any small sharp-pointed tool may be inserted between the bowed portion of the pin and the nut to partially withdraw the same or the said bowed portion may be gripped by a pair of pincers and after being slightly withdrawn, turned by them until the pin is entirely unseated.

Figure 1:
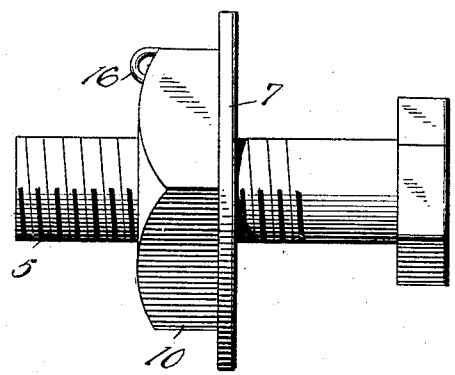
Figure 2:
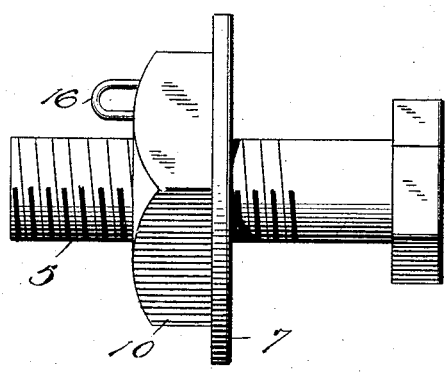
Figure 3:
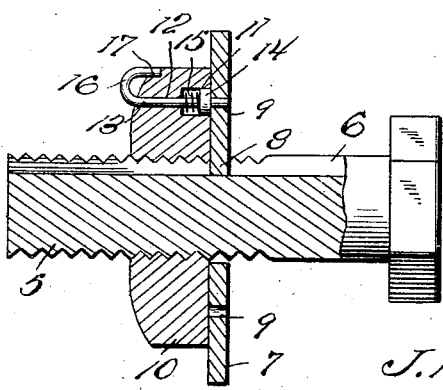

In the accompanying drawings: Figure 1 is a side elevation of the device. Fig. 2 is a similar view, the pin being shown turned to cause complete disengagement from the washer, and Fig. 3 is a detailed vertical longitudinal sectional view through the bolt, nut, and washer.

Referring more specifically to the drawings, there is shown a bolt 5 which is provided with a longitudinally extending groove 6. A washer 7 is engaged upon the bolt and is provided upon its inner periphery with an inwardly projecting tongue 8 which extends into the groove 6 and the washer is also provided with a circular series of openings 9.

Engaged upon the bolt 5 is a nut 10 and this nut is provided with a major bore 11 and a minor bore 12. Slidably engaged in the minor bore 12 is a pin 13 and this pin is provided intermediate its ends with a collar 14 which fits snugly within the major bore 11 and between which and the end wall of the said bore and upon the pin 13 is disposed a helical spring 15 which normally tends to force that portion of the pin 13 which lies beyond the collar 14, into one of the openings 9 in the washer 7. The opposite end portion of the pin extends beyond the outer face of the nut and is bent upon itself in the arc of a circle as at 16, the extreme end of the bent over portion being normally seated in a recess 17 formed in the said outer face of the nut. The bight portion of the pin being at all times in spaced relation with the outer face of the nut as will be readily seen in Figs. 1 and 3 of the drawings, any small sharp-pointed tool may be engaged with the bight portion to withdraw the pin from engagement with the opening in the washer and with the recess in the nut. After this is done the pin is turned and the extreme end of its bent over portion will ride upon the outer face of the nut, the said outer face of the nut being slightly convexed for this purpose. It will be readily understood that the pin will be held in this engaged position after being so turned and that the nut may then be quickly and readily removed from the bolt.

What is claimed is:—

A device of the class described comprising a bolt, a washer locked to the bolt against rotation with respect thereto, but movable longitudinally thereon, said washer being provided with a plurality of openings, a nut engaged upon the bolt, said nut being provided with a bore adapted to register with the openings in the washer, the nut being provided with a convexed outer face through which the bore opens, a pin slidably seated in the bore in the nut and adapted for the engagement of one of its ends interchangeably in the openings in the washer, a collar on said pin adapted to contact with the washer, and a spring engaged upon the pin and bearing at one of its ends against the collar and at its other end against a shoulder formed by reducing the bore, the opposite end of the pin being bent over upon itself, there being a seat formed in the nut for the reception of the end of the bent over portion of the pin when the same is in engagement with the openings in the washer, and the pin being maintained against other than vertical and rotary movements in the holes in the nut and washer.

In testimony whereof, I affix my signature, in presence of two witnesses.

JOHN H. GLOSAP.

Witnesses:
  W. T. THOMAS,
  M. C. RIDER.